May 19, 1925.
A. MITTASCH ET AL
1,538,574
EXTRACTION OF SULPHUR
Filed Nov. 3, 1920
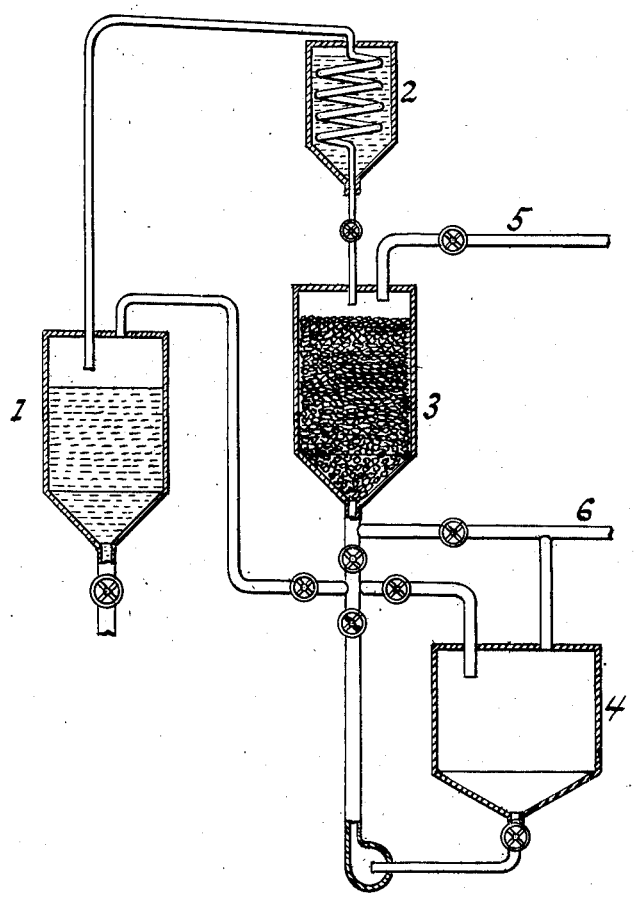
INVENTORS
Alvin Mittasch
BY Fritz Winkler
Hans Harland
ATTORNEYS Patented May 19, 1925.

1,538,574

UNITED STATES PATENT OFFICE.

ALWIN MITTASCH AND FRITZ WINKLER, OF LUDWIGSHAFEN-ON-THE-RHINE, GERMANY, ASSIGNORS, BY MESNE ASSIGNMENTS, TO BADISCHE ANILIN & SODA FABRIK, OF LUDWIGSHAFEN-ON-THE-RHINE, BAVARIA, GERMANY, A CORPORATION OF THE GRAND DUCHY OF BADEN.

EXTRACTION OF SULPHUR.

Application filed November 3, 1920. Serial No. 421,594.

*To all whom it may concern:*

Be it known that we, ALWIN MITTASCH and FRITZ WINKLER, citizens of Germany, residing at Ludwigshafen-on-the-Rhine, Germany, have invented new and useful Improvements in Extraction of Sulphur, of which the following is a specification.

The present invention relates to an improved process of extracting sulphur from exhausted active charcoal which has served for the removal of sulphur contents from gases. The invention is based on the known fact that sulphur readily dissolves in ammonium sulphide solution, and it has as its object a particularly advantageous method of commercially employing ammonium sulphide for the said purpose.

According to our invention, the ammonium sulphide serving for the extraction of the sulphur from the charcoal charged with free sulphur is conveyed through said charcoal by means of distillation and condensation, which we prefer to carry out in an inert, or reducing, atmosphere. The nature of the invention will more clearly result from the following explanations.

The accompanying drawing illustrates a diagrammatical view of an apparatus embodying this invention.

The vessel 3 containing the exhausted charcoal from which the sulphur is to be extracted is combined with a distilling vessel 1, to which heat is supplied in a suitable manner, on the one hand and a condenser 2, which is preferably situated above said vessel on the other hand. The whole is combined by pipe so as to form a closed circulating system which is operated in the following manner. The distilling vessel 1 is supplied with a weak ammonium sulphide solution and the latter heated to boiling point; the vapors which are rich in ammonium sulphide are led to the condenser where a strong ammonium sulphide solution is produced, and the latter, while in a warm, or cold condition, then continuously runs through the extraction vessel 3 containing the sulphur bearing mass, preferably in a downward direction. The level of the liquid in said vessel 3 is kept at least as high as to reach the upper end of the mass, and from there, the solution, being more or less saturated with sulphur flows back into the distilling vessel 1. The operation may be continued until the ammonium sulphide solution flows nearly uncolored, or even colorless, from the extraction vessel 3. The ammonium polysulphide solution leaving the extraction vessel, when entering into the boiling contents of the distilling vessel is at once decomposed giving off vapors rich in ammonium sulphide and leaving sulphur which accumulates in the distilling vessel and in most cases will separate out in the course of the distillation; finally it may be completely separated in a free state, if necessary, by simply driving off the ammonium sulphide whereupon the residue is filtered. The operation may also be started with free ammonia, or with ammonium carbonate solution, which on passing through the sulphur containing charcoal will give rise to the formation of ammonium sulphide.

Generally speaking, the ammonium sulphide solution contained in the distilling vessel need not be very strong and we have found that diluted solutions even offer some particular advantages. For example, we employ solutions containing not more than about 30 grams of sulphur (in the form of sulphide) in each litre, the ammonia content varying within wide limits. Such solutions, on being distilled, first give vapors by the condensation of which a concentrated ammonium sulphide solution is obtained, as is very suitable for a quick extraction, whilst in the distilling vessel a liquid which is practically free from ammonium sulphide is left behind, when the proportions of the distilling and the extraction vessels are properly chosen. In order to enable the charcoal, when the extraction is over, to be washed with a distillate substantially free from ammonium sulphide, a separate receiver 4 is arranged with suitable pipe connections and valves, so that the liquid running from the condenser and through the vessel containing the mass to be extracted may be directed either back into the distilling vessel 1 or into said receiver 4, as may be required. This mode of performing the process will more exactly result from the following explanation.

The distilling vessel 1 above referred to contains a solution of ammonium sulphide with say 2.5 per cent sulphur (as sulphide) in a quantity insufficient for extracting the sulphur should it once pass through the mass in the extraction vessel. The solution is distilled and the condensed liquid having passed through the extractor 3 is continuously returned into the distilling vessel 1 until it runs from the extractor practically colorless. Then the condensate which is a strong and nearly pure solution of ammonium sulphide, is made to run into the receiver 4 and on continuing the distillation practically pure water is condensed by which the mass is thoroughly washed. The washing fluid is either carried back into the distilling vessel, or into a separate receiver arranged parallel to such strong aforesaid receiver. The sulphur extracted from the charcoal is completely precipitated in the distilling vessel and may be drawn therefrom through a suitable opening and completely removed by rinsing with water.

For starting a new extraction operation the concentrated ammonium sulphide solution contained in the receiver is pressed back either into the distilling vessel or directly into the extraction vessel and the process can be started afresh.

When the ammonium sulphide solution is fed into the extraction vessel containing the sulphur-bearing charcoal, the polysulphide solution formed will eventually run over and flow into the distilling vessel, where water or a very dilute ammonium sulphide solution is kept boiling. The polysulphide is here at once decomposed into sulphur and ammonium sulphide which is driven off and condensed to a strong ammonium sulphide solution, which latter runs back into the extraction vessel, thus accomplishing a closed cycle.

The invention is of particular value when combined with the method of removing sulphuretted hydrogen or the like from gases by catalytic oxidation with air, employing active charcoal as a catalyst. By means of the described process it is possible to alternately saturate the contact mass with sulphur by passing the gas containing sulphuretted hydrogen and oxygen through a layer of it and to remove the absorbed sulphur in the described manner while effecting both operations in the same vessel. The gas containing the sulphuretted hydrogen may be introduced by the supply tube 5 and the purified gas withdrawn by the tube 6 or vice versa. The extracted mass, which is in a moist condition, may be dried by superheated steam or hot gases taken from the manufacture itself and is then at once ready for a further absorbing operation; it is not, generally, necessary for this purpose to completely remove the moisture from the mass.

As we have further found, the most suitable material for every part of the apparatus coming into contact with ammonium sulphide solution is aluminum or its alloys and such metals may be used for the respective parts of the apparatus or, at least, for coating their inner surface.

We claim:—

1. The process of extracting sulphur from active charcoal containing free sulphur which consists in passing through the mass ammonium sulphdie solution by distilling an aqueous solution of ammonium sulphide, condensing its vapors immersing the charcoal in the condensate and causing the distillate to run non-intermittently through the sulphur-containing mass.

2. The process of extracting sulphur from active charcoal containing free sulphur by distilling an aqueous solution of ammonium sulphide, condensing the vapors immersing the charcoal in the condensate, passing the condensed liquid through the sulphur carrying mass in a non-intermittent flow and again subjecting it to distillation, the whole operation being effected continuously in a closed cycle.

3. The process of extracting sulphur from active charcoal containing free sulphur by distilling an aqueous solution of ammonium sulphide, condensing the vapors immersing the charcoal in the condensate, passing the condensate through the sulphur-carrying mass in a non-intermittent flow, decomposing the polysulphide solution by distillation and continuously effecting said operations in a closed cycle until the sulphur is substantially extracted, then separately collecting the strong ammonium sulphide solution distilled and washing the charcoal.

4. The process of extracting sulphur from active charcoal containing free sulphur as a step in the process of withdrawing sulphur compounds from gases, which consists in distilling a dilute aqueous solution of ammonium sulphide, condensing the vapors immersing the charcoal in the condensate, passing the condensate through the charcoal in a non-intermittent flow, then again subjecting it to distillation until the sulphur is substantially removed from the charcoal, then collecting the condensed concentrated ammonium sulphide solution separately and continuing the distillation until the charcoal is washed, drying the charcoal and passing a gas containing sulphur and oxygen through the charcoal and repeating the operations, when the charcoal is charged with sulphur.

5. An apparatus serving for the extraction of sulphur from charcoal containing same in the free state characterized by the inner surface of each part exposed to ammonium sulphide solution consisting of an aluminum containing metal.

In testimony whereof we have hereunto set our hands.

ALWIN MITTASCH.
FRITZ WINKLER.